United States Patent
Marzaro

(10) Patent No.: US 10,492,498 B2
(45) Date of Patent: Dec. 3, 2019

(54) FILLED PASTA MAKING MACHINE AND RELATED METHOD FOR MAKING FILLED PASTA

(71) Applicant: SIRMAN S.P.A., Campo San Martino (PD) (IT)

(72) Inventor: Luca Marzaro, Curtarolo (IT)

(73) Assignee: SIRMAN S.P.A., Campo San Martino (PD) (IT)

( * ) Notice: Subject to any disclaimer, the term of this patent is extended or adjusted under 35 U.S.C. 154(b) by 292 days.

(21) Appl. No.: 14/894,533

(22) PCT Filed: May 29, 2014

(86) PCT No.: PCT/IT2014/000148
§ 371 (c)(1),
(2) Date: Nov. 29, 2015

(87) PCT Pub. No.: WO2014/192035
PCT Pub. Date: Dec. 4, 2014

(65) Prior Publication Data
US 2016/0113294 A1     Apr. 28, 2016

(30) Foreign Application Priority Data

May 30, 2013   (IT) .............................. VI2013A0142

(51) Int. Cl.
*A21C 9/06*        (2006.01)
*A21C 11/20*       (2006.01)
(Continued)

(52) U.S. Cl.
CPC .............. *A21C 9/066* (2013.01); *A21C 9/063* (2013.01); *A21C 11/20* (2013.01); *A23L 7/11* (2016.08); *A23P 30/20* (2016.08); *A23V 2002/00* (2013.01)

(58) Field of Classification Search
CPC .......... A21C 9/063; A21C 9/066; A21C 11/20; A21C 11/18; A23P 30/20; A23L 7/11
See application file for complete search history.

(56) References Cited

U.S. PATENT DOCUMENTS

| | | | |
|---|---|---|---|
| 1,858,507 A * | 5/1932 | Sherman | A21C 9/066 |
| | | | 425/506 |
| 2,759,433 A | 8/1956 | Szadziewicz | |
| (Continued) | | | |

FOREIGN PATENT DOCUMENTS

| | | |
|---|---|---|
| EP | 1424010 A2 | 6/2004 |
| EP | 2505066 A2 | 10/2012 |
| IT | PR2011A000089 A1 | 4/2013 |

OTHER PUBLICATIONS

Italian Search Report and Written Opinion (partially in English) dated Feb. 4, 2014.
(Continued)

*Primary Examiner* — Ibrahime A Abraham
*Assistant Examiner* — John J Norton
(74) *Attorney, Agent, or Firm* — Hedman & Costigan, P.C.; James V. Costigan; Kathleen A. Costigan

(57) ABSTRACT

A machine for making filled pasta, comprising a first modular unit (10), consisting of a kneading machine equipped with a container (11) within which the dough is formed, and a second modular unit (16), constituted by a ravioli machine, which is able to place filling doses inside the dough for continuously producing tortellini, ravioli, etc.; an extruder or die (12) is placed in correspondence of the bottom of said container (11) of the kneading machine, so as to give a desired shape to the dough at the extruder's output. The extruded pasta is thus conveyed downstream the extruder (12) and inside the ravioli machine.

8 Claims, 5 Drawing Sheets

(51) Int. Cl.
    *A23P 30/20*     (2016.01)
    *A23L 7/109*     (2016.01)

(56) References Cited

U.S. PATENT DOCUMENTS

| | | | | | |
|---|---|---|---|---|---|
| 3,299,835 | A | * | 1/1967 | Marsili | A21C 9/066 |
| | | | | | 425/292 |
| 3,734,672 | A | * | 5/1973 | Glabe | A21C 11/16 |
| | | | | | 425/461 |
| 4,389,181 | A | * | 6/1983 | Frick | B29C 47/14 |
| | | | | | 264/176.1 |
| 4,634,485 | A | * | 1/1987 | Welygan | B29C 47/003 |
| | | | | | 156/244.11 |

OTHER PUBLICATIONS

International Search Report in corresponding application dated Oct. 6, 2014.

English translation of the main claim of PR2011A000089 of Apr. 22, 2013.

* cited by examiner

FILLED PASTA MAKING MACHINE AND RELATED METHOD FOR MAKING FILLED PASTA

The present invention generally relates to a machine for making filled pasta and to a method thereof.

More particularly, the invention relates to a modular machine which continuously makes stuffed pasta (specifically, ravioli), from the mixing phase up to the final product.

Machines for making filled pasta and particularly for making ravioli are still known; they use an already cooked pastry, which is prepared carrying out a first working of the dough in a kneading machine and a second working of the pasta obtained by means of a sheeter machine, which is able to make strips of dough, usually wrapped in rolls.

The strips of dough are manually placed on rollers that convey them below a cylindrical cup containing the filling for ravioli and therefore the filling dose falls on the pastry.

The sheets are then joined by enclosing within them the filling, after the dosing phase of the latter, and after passing them between two opposite rollers, one of which is shaped and one smooth (and having holes or grooves), so as to make ravioli.

The use of rollers having different geometric configurations and shapes allows to make different shapes of ravioli.

For example, EP2505066A2 describes a modular machine for making filled pasta comprising a kneading machine, a sheeter machine and a ravioli machine, which are connected together and placed one behind the other; practically, the dough which goes out from the first modular machine (the kneading machine) is conveyed by means of a screw conveyor (auger) and automatically enters the second modular machine (the sheeter) which is mechanically connected to the kneading machine.

The kneading machine and the sheeter are connected together through a plurality of rods and by means of a drive shaft, which takes the power from a power take-off derived from the motor drive of the first modular machine and transmits the movement to the second modular machine.

The pastry then enters the ravioli machine, which inserts the filling dose and longitudinally closes the pastry by driving a smooth roller and a shaped roller, which are frontally placed and which form the ravioli; the filling dose is inserted by means of a piston, driven by a rack, which gives pressure on the filling dose to make it fall on the pastry.

However, each modular machine which is used in known ravioli machines operates at different times, has its structure and its motorisation and requires its overall dimensions for both the installation phase and the maintenance phase.

Furthermore, said known machines are expensive and require at least two layers of pastry to obtain the filled ravioli.

An object of the present invention is therefore to obviate the above mentioned drawbacks of the prior art and, in particular, to make a machine for continuously making filled pasta and, in particular, ravioli, simply by starting from the dough.

Another object of the present invention is to provide a machine for making filled pasta, which is composed of single modular units and which is able to make the pastry directly onto the kneader machine.

Another object of the invention is to provide a machine for making filled pasta, which is extremely reliable and efficient, as well as cheap and easy to use, with respect to the known filled pasta machines.

A further object of the present invention is to provide a process for producing filled pasta, which is carried out by means of the above mentioned machine.

Said objects, as well as other objects, are achieved, according to the present invention, by a machine and method for making filled pasta according to the present specification.

Advantageously, unlike the known ravioli machines, the machine according to the present invention is able to make the pastry directly on the kneading unit, thus avoiding to send the dough which comes from the auger of the kneading unit to a sheeter machine; in fact, according to the present invention, a sheeter machine is not used at all.

The pasta is actually extruded and then sent to a further modular unit, which is placed after the kneader unit and which is provided for placing the filling dose and for bending the flaps of the pastry so as to form the ravioli, thus saving an execution phase, with respect to the prior art, since the use of a sheeter machine is avoided, thereby saving time and operative and producing costs.

Moreover, the machine according to the invention allows to make extruded pasta and not laminated pasta (said two types of pasta have a different response to the cooking and, in particular, the extruded pasta has better organoleptic features with respect to the sheeted pasta), as well as the machine according to the present invention improves the step of closing the dough's flaps when ravioli are made and allows to obtain rough or "raw" pasta, rather than smooth pasta, in order to better absorb and retain sauces and dressings.

These and other objects and advantages will be more clear from the following description, which relates to a preferred embodiment of the machine for making filled pasta, according to the present invention, and from the enclosed drawings, in which.

Figure 1:
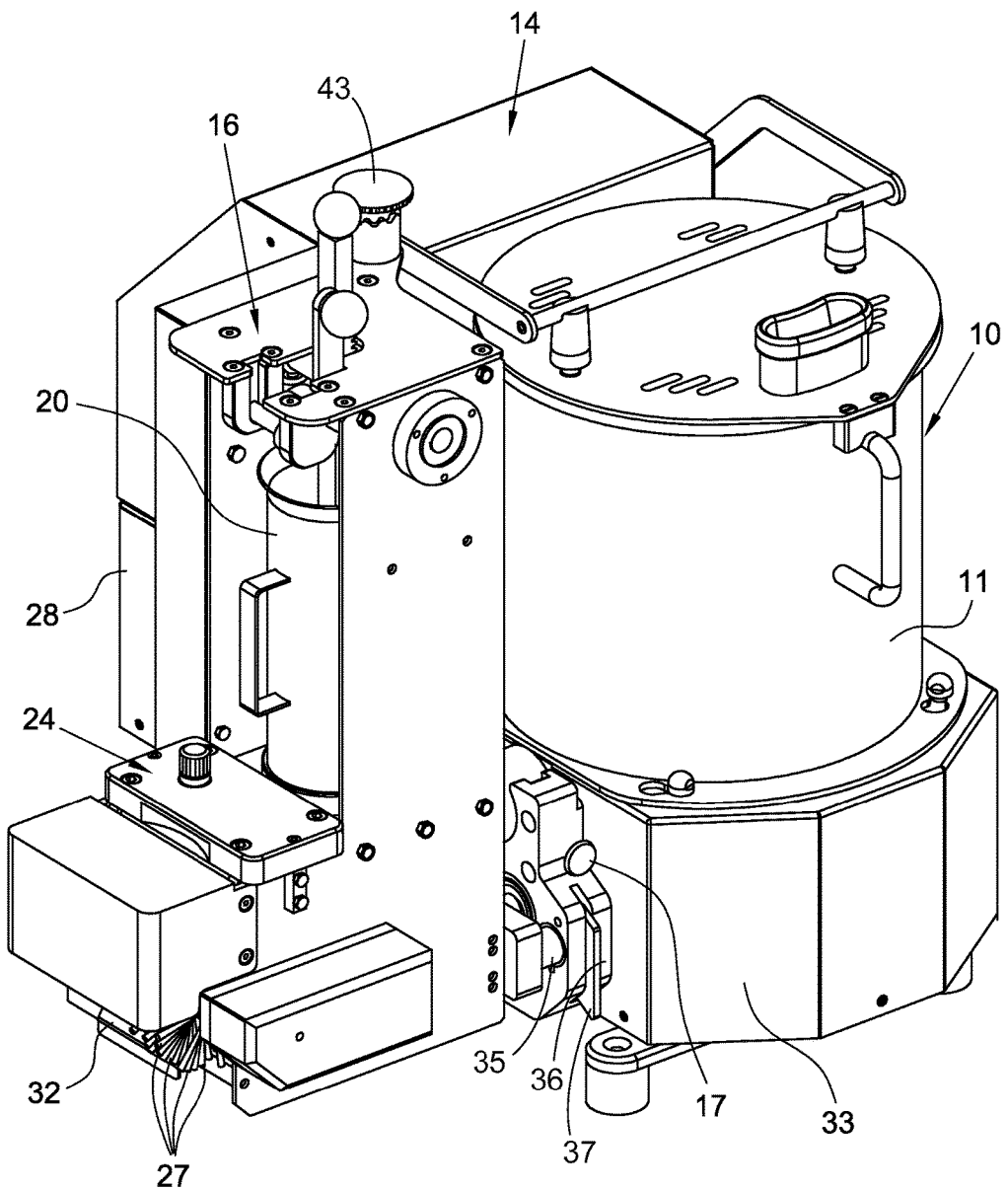
FIGS. 1 and 2 show two perspective side views of the machine for making filled pasta, according to the present invention.
Figure 2:
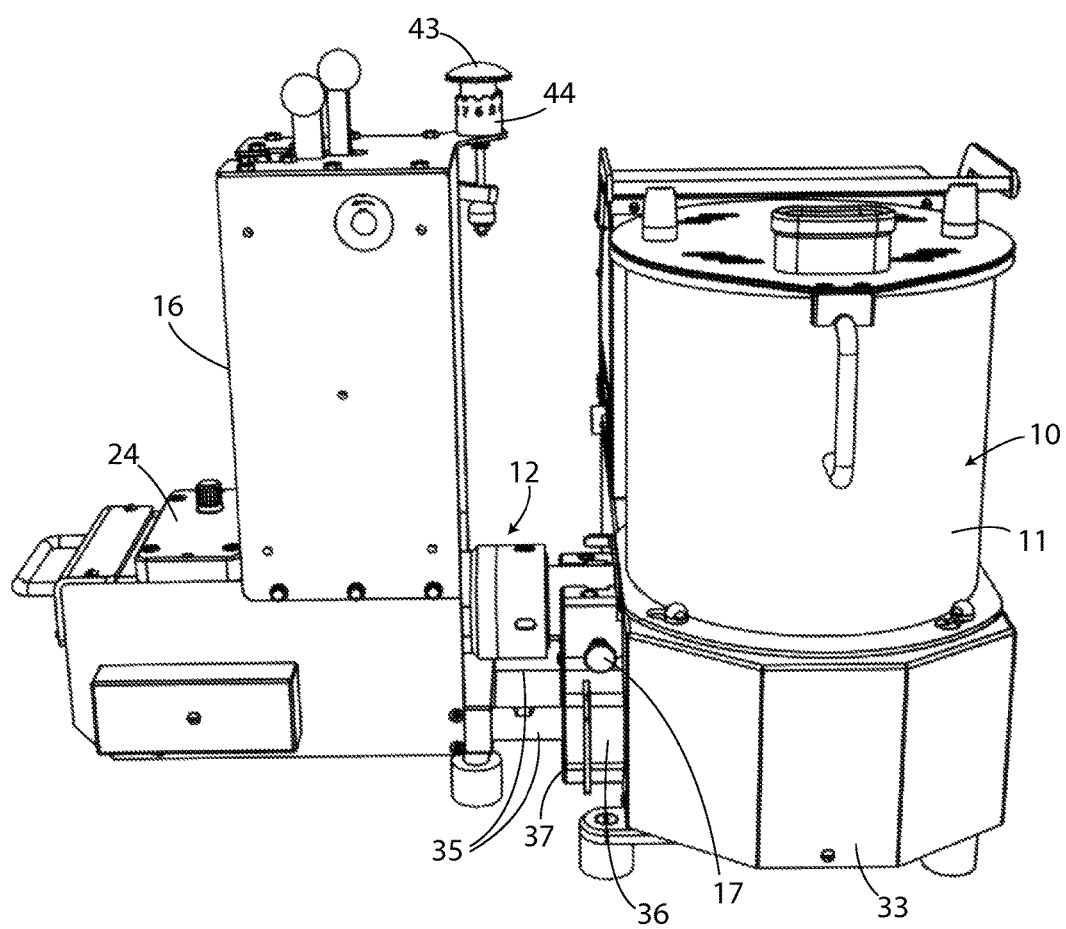
Figure 3:
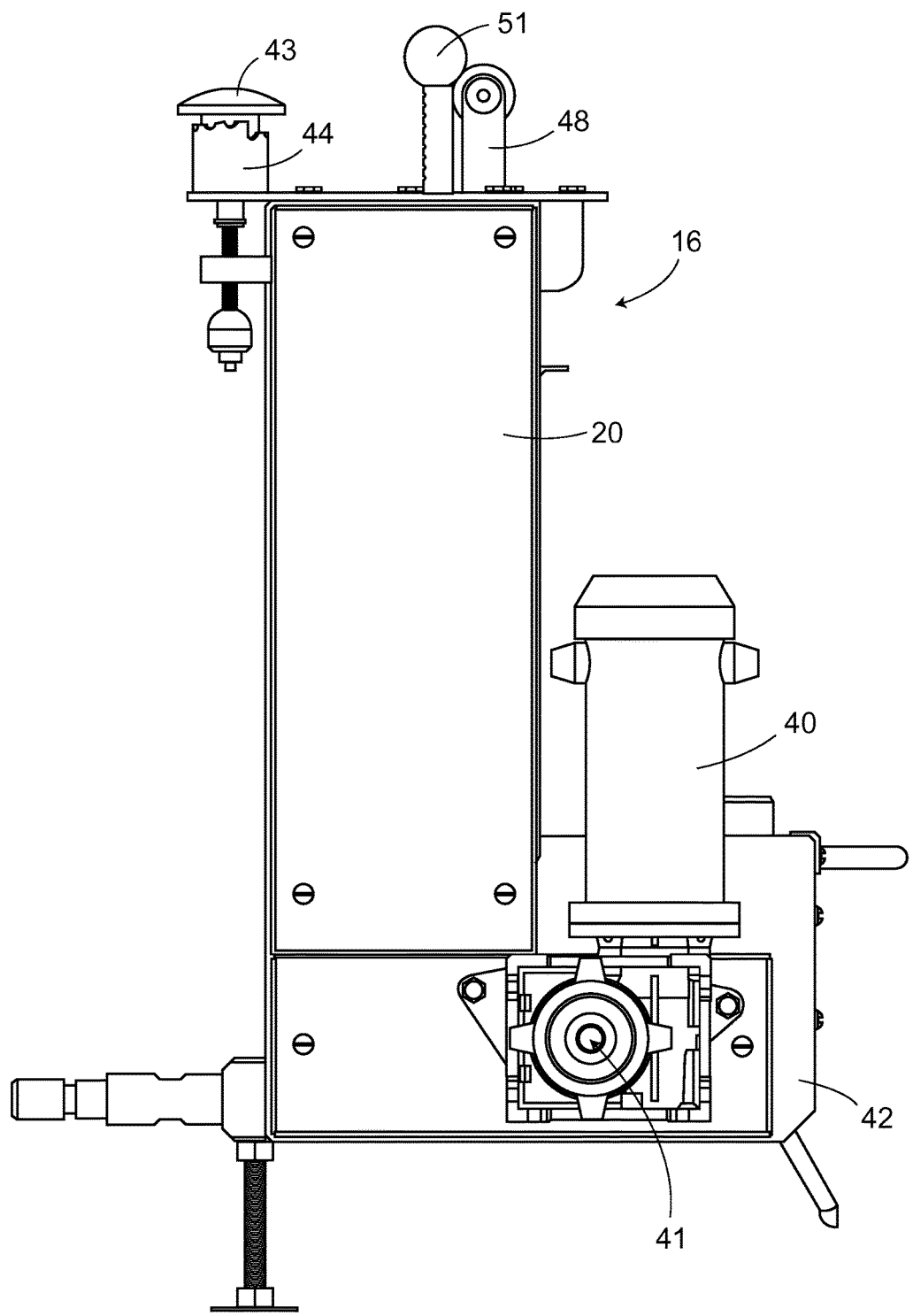
FIG. 3 is a partial and partially sectioned side perspective view, opposite to the side views of FIGS. 1 and 2, of the machine for making filled pasta, according to the invention.
Figure 4:
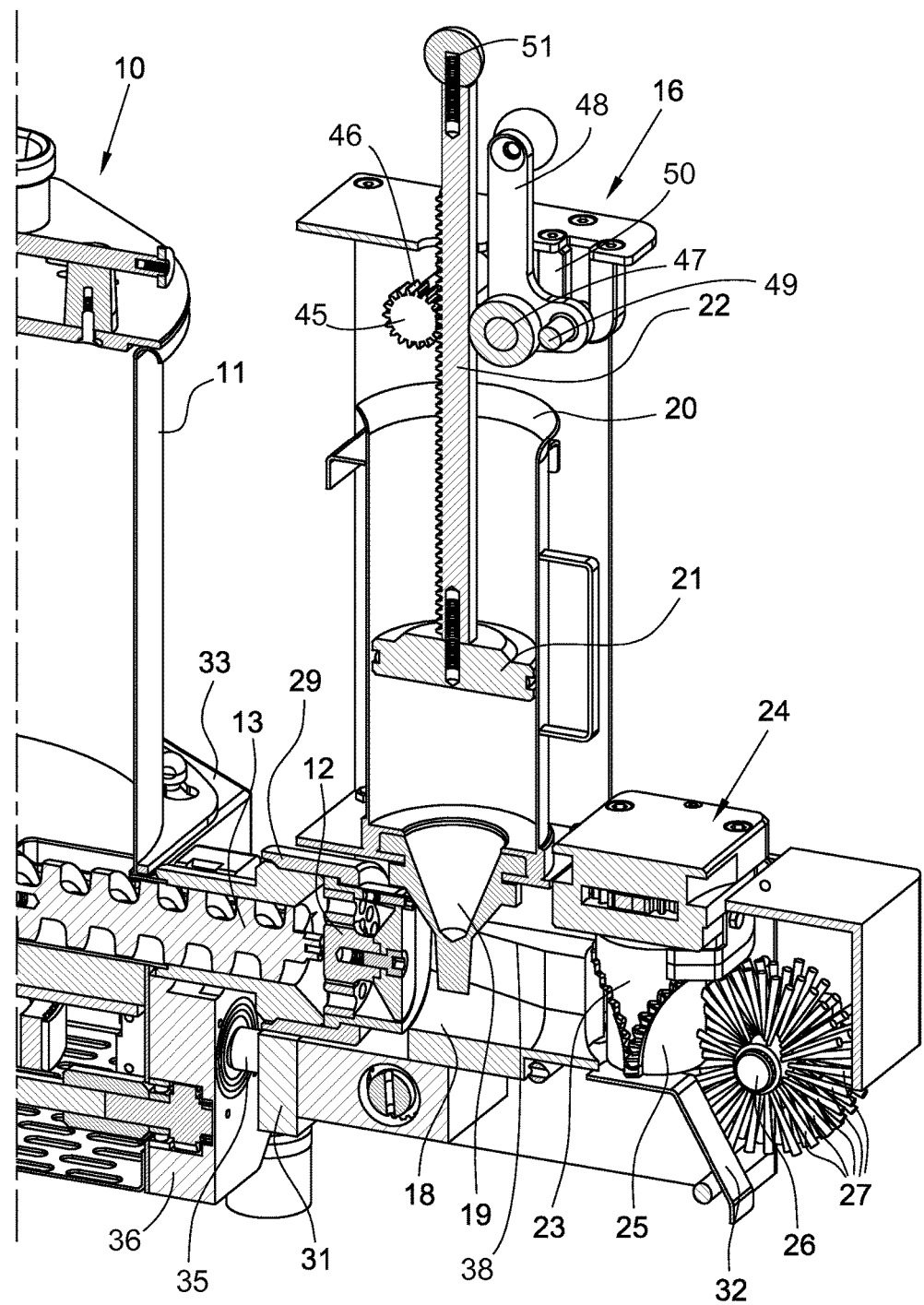
FIG. 4 is a partial and partially sectioned view of the machine for making filled pasta, according to the invention.
Figure 5:
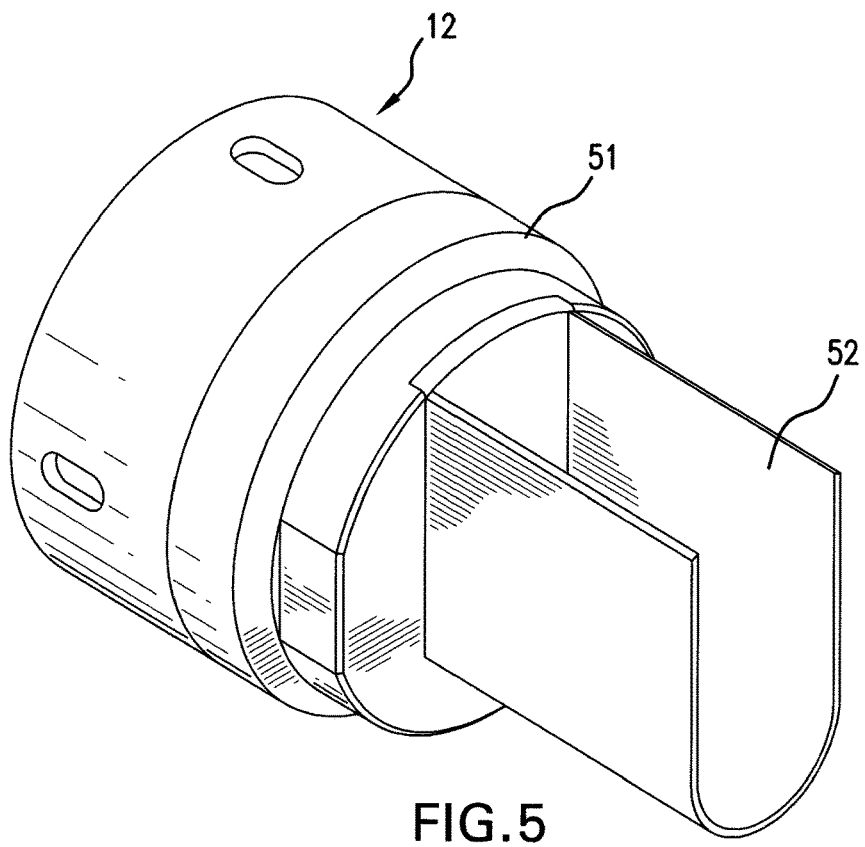

FIG. 5 is a perspective view of the end of die 12 which shows pasta 52 being extruded from the die 12 folded in a "U" shape having wings that project upwardly.

Figure 6:
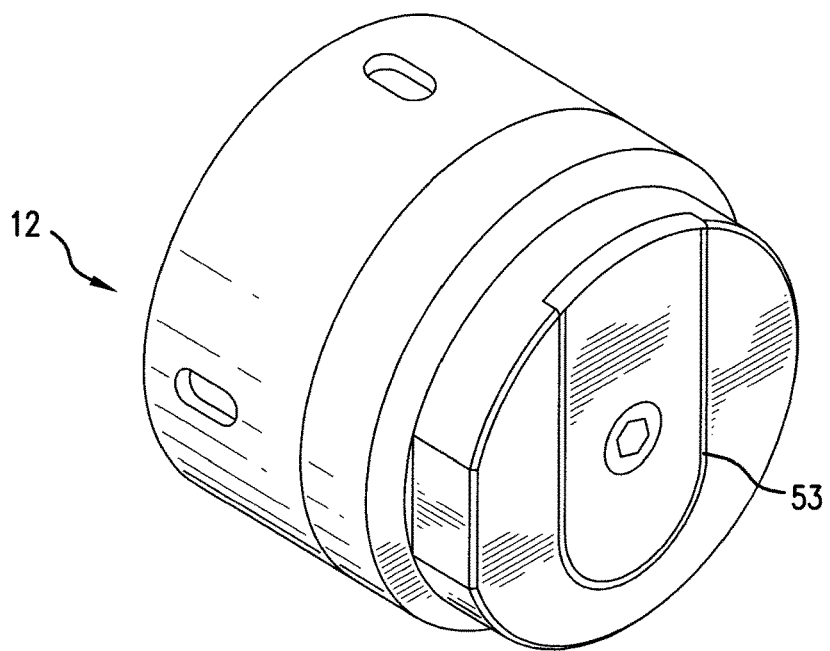

FIG. 6 is a perspective view of the die 12 which shows the "U" shaped opening 53 in die 12 from which the extruded pasta is delivered.

With reference to the above mentioned figures, the machine for making filled pasta according to the present invention comprises a first modular unit 10 (constituted by a kneading machine), which includes a base 33 and a vertical cylindrical container 11, usually made of stainless steel and having inside a planetary mixer consisting of a spiral rotating around its axis passing through the center of the container 11, so that the combination of said movements causes a mixer rotation while the same mixer moves inside the container 11, so as to better mix and knead the different ingredients.

According to the invention, the dough thus produced is pressed and extruded by means of a screw or auger 13 placed on the bottom of the container 11, inside a die or extruder 12, which gives the desired shape to the dough which goes out from the kneading unit 10.

In particular, the die 12 has an end shaper, preferably made of bronze, which directly makes the extruded pasta, driven by the screw 13, at the output of the kneading unit 10, so that the above extruded pasta is folded at least partially upwards, thus making a containment channel for placing the filling dose, and so that the surface of the dough will be slightly wrinkled and more suitable to hold sauces and dressings.

The ravioli modular unit 16, which is able to place the filling dose inside the extruded pasta, is placed next to the kneading unit 10 and connected with said kneading unit 10 through pins 35, which are provided with a groove (not shown) and which are inserted in a block 36 firmly connected with the kneading unit 10.

A blade 37 is inserted into the groove to lock the pins 35; the blade 37 can also be removed to allow the detachment of the whole ravioli modular unit 16 from the modular kneading unit 10.

The die 12 is driven by a gearmotor 40, contained within the casing 14, through a plurality of gears and a bevel gear pair; as described in the following, said gearmotor 40, which can be driven by the operator through a control panel, can also be used for handling the mixer of the kneading modular unit 10.

Therefore, once the dough is finished, a drain window placed on the bottom of the container 11 is manually or automatically opened and the dough drops into the auger 13 and from here into the extruder 12, which is able to send the extruded pasta exiting from the kneading unit 10 to the second modular ravioli unit 16, which is provided for placing the filling dose inside the extruded pasta and to fold the dough in order to obtain the ravioli.

As already said, the extruder 12 gradually receives the dough from the container 11 of the kneading unit 10 and continuously makes the extruded pasta, also by adjusting the thickness by means of the knob 17.

The extruded pasta is therefore placed on the conveyor belt 18, which conveys it under the conic dispenser 19 of the cylindrical container 20 containing the filling for ravioli; the belt 18 is provided between two side rails 38, which maintain in a vertical direction the folded wings of the "U" according to which the extruded pasta is shaped, so as to allow the filling dose to come down from the top of the conic dispenser 19. Moreover, the belt 18 is flanked by a plurality of belts which are wound on horizontal and inclined pulleys, in order to raise the dough to the sides, to fold the dough lengthwise into two flaps and enclose the filling dose inside the two flaps folded upwards, after the dosage of said filling dose which is carried out by means of the piston 21, which is driven in turn by the rack 22.

More in detail, the piston 21 gives pressure to the filling dose to drop it to the center of the dough (the filling dose is prefixed by the operator through a controller not shown in the attached figures) and the filled dough passes through the mould 24, consisting of a smooth roller 23 and a shaped roller 25.

A plurality of holes or cavities which are made on the smooth roller 23 are provided for giving the desired shape to the ravioli and the machine is able to make different types of ravioli simply by replacing the mould 24 and the related rollers 23, 25.

The extruded pasta goes towards the mould 24, which includes the smooth roller 23 and the shaped roller 25, said rollers rotating around their vertical axis; the mould 24 thus allows to close the flaps of the dough with the filling dose, so as to form one or more ravioli at each revolution of said rollers 23, 25.

A brush 27 can also be placed close to the rollers 23; said brush 27 is able to rotate transversely with respect to the direction of the ravioli which go out on the discharge chute 32, so as to cause the detachment of the ravioli when they stick to the roller. In fact, the cylinder 26 of the brush 27 is driven by a drive belt which is moved by the same single motor placed within the casing 14 of the filled pasta machine according to the present invention.

The gearmotor 40 is powered by the kneading unit 10 and is able to change the number of revolutions; said gearmotor 40 is keyed on a shaft 41, supported by a plate 42 forming part of the frame of the modular ravioli unit 16. Said gearmotor 40 drives the mixer of the container 11, as well as, through a plurality of gears and belts placed within the crankcase 28 of the machine, all the other moving parts of the machine, such as the conveyor belt 18, the rack 22, the extruder 12 and the rollers 23, 25 of the mould 24.

It follows that the use of a single electric motor, besides constituting a mechanically simple solution, ensures a considerable energy saving, as well as the maintenance of all the moving parts of the machine. Moreover, the kneading unit 10 can be easily connected to the ravioli unit 16, simply by connecting the extruder 12 to the fitting 29 and by inserting and fixing the pins 35 inside the related fittings 31; therefore, the extruder 12, the belt 18, the rollers 23, 25 and the cylinder 26 (if present) take the power from the motor of the kneading unit 10.

Furthermore, the amount of filling that is placed on the extruded pasta is adjusted by means of a rotary knob 43, with a pin which is positioned within the branch of a cam 44 supported by the frame of the kneading unit 10; the rotation of the knob 43 allows to adjust the arc of rotation of the pin 45 and consequently the speed of the rack 22, so as to vary the speed of the piston 21, which thus creates a continuous filling worm that is placed within the dough channel formed by the extruder 12.

The rack 22 is held in a vertical position between the toothed wheel 46 and an idle roller 47, which has a rotation shaft supported by a fixing lever 48; the fulcrum 49 of the lever 48 can move vertically in order to exit from a guide 50, thus allowing the movement of the idle roller 47 from the rack 22. The rack 22 can be thus taken through the knob 51 and manually pulled upward to pull the piston 21 from the cylinder or container 20, in order to perform the filling of said container 20 with the filling.

Therefore, the modular kneading unit 10 and the modular ravioli unit 16 are connected together as described above and constitute the whole machine for making filled pasta according to the present invention.

In particular, the machine is able to continuously make any type of ravioli simply by starting from the dough and by employing a modular kneading unit 10 which is mechanically connected to a modular ravioli unit 16, without having to use a sheeter machine downstream of the kneading unit 10 to provide a sheet to the ravioli unit 16; in fact, according to the present invention, the dough is pressed toward the extruder 12 which directly produces the extruded pasta, which then enters into the ravioli unit 16.

From the above description has been found that the technical features of the machine for making filled pasta, which is the object of the present invention, give considerable advantages, such as:

use versatility with respect to the types of filled pasta;
    high production;
    saving the overall dimensions of the machine, with respect to the prior art;
    energy savings, since the machine uses a single electric motor;
    full automatic method;

saving the production and operation costs, with respect to the prior art;

making an extruded pasta, which can be closed, after having placed the filling dose, in a simple and effective way;

obtaining a "raw" pasta, which is able to better hold sauces and condiments.

Finally, it is clear that other variations may be made to the filled pasta making machine, without departing from the principles of novelty inherent in the inventive idea as claimed in the appended claims.

The invention claimed is:

1. A machine for making filled pasta, comprising a first modular unit (10) consisting of a kneading machine equipped with a container (11) within which a dough is formed, and a second modular unit (16), consisting of a ravioli machine for making filled pasta, which is able to insert filling doses inside the dough for continuously producing ravioli, tortellini, or other filled pasta wherein:

a screw or auger (13) is in communication with a bottom of said container (11), said screw or auger (13) pushing the dough into a die or extruder (12), which gives, by means of a forming device, a desired shape to the dough, so that said dough exiting the extruder (12) is folded in a U-shape with the wings of the U oriented upwards so as to form a channel in which said filling doses are placed, said machine being located downstream of said extruder (12) and being mechanically connected to said kneading machine.

2. The machine for making filled pasta according to claim 1, characterized in that:

said dough exiting said extruder (12) rests on a conveyor belt (18) of said ravioli machine, which has an axis with the same direction of the axis of said extruder (12), wherein said conveyor belt (18) of said ravioli machine is maintained in a vertical direction by two side rails (38), said conveyor belt (18) being designed to convey the dough exiting said extruder (12) below a conic dispenser (19) of a container (20) containing filling for placing one or more filling doses inside the dough.

3. The machine for making filled pasta according to claim 2, characterized in that:

said filling doses are inserted by means of a piston (21) which is connected to a rack (22).

4. The machine for making filled pasta according to claim 3, characterized in that:

a cylinder (26) is provided with brushes (27) where said cylinder (26) rotates transversely with respect to an output direction of said filled pasta exiting from said ravioli machine, and is placed in communication with rollers (23, 25) in order to cause the detachment of the ravioli.

5. The machine for making filled pasta according to claim 4, characterized in that:

said machine has a single gearmotor (40), which drives all the moving parts of the machine, including said rack (22), said extruder (12), said rollers (23, 25), said cylinder (26) and said belt (18).

6. The machine for making filled pasta according to claim 4, characterized in that:

said ravioli machine is electrically and mechanically connected to said kneading machine by means of said extruder (12) through at least one fixing pin (35).

7. The machine for making filled pasta according to claim 3, characterized in that:

said filling doses, which are laid on said dough exiting from said extruder (12), are regulated via a rotary knob (43), which controls the speed of said rack (22) and of said piston (21).

8. The machine for making filled pasta according to claim 3, characterized in that:

said rack (22) and said piston (21) are manually removable from said container (20).

* * * * *